United States Patent
Shimakawa et al.

(10) Patent No.: US 12,523,823 B2
(45) Date of Patent: Jan. 13, 2026

(54) OPTICAL FIBER BUNDLE AND OPTICAL SWITCH

(71) Applicant: SUMITOMO ELECTRIC INDUSTRIES, LTD., Osaka (JP)

(72) Inventors: Osamu Shimakawa, Osaka (JP); Hidehisa Tazawa, Osaka (JP); Masato Tanaka, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 241 days.

(21) Appl. No.: 18/368,900

(22) Filed: Sep. 15, 2023

(65) Prior Publication Data

US 2024/0134126 A1 Apr. 25, 2024
US 2024/0231006 A9 Jul. 11, 2024

(30) Foreign Application Priority Data

Oct. 24, 2022 (JP) .................................. 2022-169961

(51) Int. Cl.
*G02B 6/38* (2006.01)
*G02B 6/35* (2006.01)

(52) U.S. Cl.
CPC .......... *G02B 6/3885* (2013.01); *G02B 6/3528* (2013.01)

(58) Field of Classification Search
CPC .................................................. G02B 6/3885
See application file for complete search history.

(56) References Cited

U.S. PATENT DOCUMENTS

| | | | |
|---|---|---|---|
| 5,742,712 A | 4/1998 | Pan et al. | |
| 2003/0152312 A1 | 8/2003 | Zhou | |
| 2006/0039645 A1 | 2/2006 | Uesugi | |
| 2014/0219613 A1* | 8/2014 | Nielson | G02B 6/4472 385/78 |
| 2017/0168247 A1* | 6/2017 | Watanabe | G02B 6/3839 |
| 2018/0074268 A1* | 3/2018 | Morishima | G02B 6/3803 |
| 2023/0266520 A1* | 8/2023 | Oda | G02B 6/02042 385/126 |
| 2023/0393362 A1* | 12/2023 | Wu | G02B 6/448 |
| 2024/0061186 A1* | 2/2024 | Wu | G02B 6/3873 |
| 2024/0142721 A1* | 5/2024 | Wu | G02B 6/3885 |

FOREIGN PATENT DOCUMENTS

| | | |
|---|---|---|
| EP | 4571375 A1 * | 6/2025 |
| JP | 2004-037652 A | 2/2004 |
| JP | 2015-79145 A * | 4/2015 |
| JP | 2021-26167 A * | 2/2021 |
| WO | WO 2024/034234 A1 * | 2/2024 |

* cited by examiner

*Primary Examiner* — Michael Stahl
(74) *Attorney, Agent, or Firm* — Oliff PLC (57) ABSTRACT

According to one embodiment, in an optical fiber bundle, in the cross section, arrangement of cores of a first multi-core fiber and arrangement of cores of a second multi-core fiber are the same as each other, arrangement of cores of a third multi-core fiber and arrangement of cores of a fourth multi-core fiber are the same as each other, and when the first multi-core fiber is rotated 180° in a circumferential direction of the first multi-core fiber, the arrangement of the cores of the first multi-core fiber is the same as the arrangement of the cores of the fourth multi-core fiber.

8 Claims, 10 Drawing Sheets

OPTICAL FIBER BUNDLE AND OPTICAL SWITCH

CROSS-REFERENCE TO RELATED APPLICATION

This application claims priority from Japanese Patent Application No. 2022-169961, filed on Oct. 24, 2022, the entire subject matter of which is incorporated herein by reference.

TECHNICAL FIELD

The present disclosure relates to optical fiber bundles and optical switches.

BACKGROUND

Specification of U.S. Pat. No. 5,742,712 discloses an optical switch. The optical switch includes a pair of GRIN lenses facing each other and a mirror inserted and ejected between the pair of GRIN lenses. The optical switch has a plurality of optical fibers extending in a side opposite to the mirror of each GRIN lens and a sleeve holding the plurality of optical fibers. In the optical switch, it is possible to switch the optical fiber to connect by inserting and ejecting the mirror between the pair of GRIN lenses.

Japanese Unexamined Patent Publication No. 2004-37652 discloses an optical switch with a mirror block. The mirror block has a first light reflecting surface and a second light reflecting surface provided at a position adjacent to the first light reflecting surface. The first light reflecting surface presents a V shape. The second light reflecting surface presents a W shape. In the optical switch, a light reflecting area is switched to a first light reflecting surface or a second light reflecting surface by an electromagnet.

Specification of U.S. Patent Application Publication No. 2003/0152312 discloses an optical switch including a multi-core collimator facing each other and two transmissive prisms. The multi-core collimator has an optical fiber, a ferrule holding the optical fiber, and a collimating lens positioned between the ferrule and the transmissive prism. The optical switch has a prism rotation mechanism that rotates each transmissive prism around the optical axis. The optical fiber is switched by the prism.

SUMMARY

An optical fiber bundle according to the present disclosure includes four or more multi-core fibers and a ferrule bundling and holding the four or more multi-core fibers. In a cross section where, among the four or more multi-core fibers, a first multi-core fiber, a second multi-core fiber, a third multi-core fiber, and a fourth multi-core fiber are cut along a plane perpendicular to a direction in which each multi-core fiber extends, lines connecting center positions of each of the multi-core fibers are arranged to form a square shape. In the cross section, the first multi-core fiber and the second multi-core fiber are aligned in this order along a first direction, the first multi-core fiber and the fourth multi-core fiber are aligned in this order along a second direction perpendicular to the first direction, and the fourth multi-core fiber and the third multi-core fiber are aligned in this order along the first direction. In the cross section, arrangement of cores of the first multi-core fiber and arrangement of cores of the second multi-core fiber are the same as each other; arrangement of cores of the third multi-core fiber and arrangement of cores of the fourth multi-core fiber are the same as each other; and the arrangement of the cores of the first multi-core fiber when the first multi-core fiber is rotated 180° in a circumferential direction of the first multi-core fiber is the same as the arrangement of the cores of the fourth multi-core fiber.

DETAILED DESCRIPTION

In recent years, the data transmission capacity continues to increase, and the development of space division multiplexing transmission technology using multi-core fibers with a plurality of cores is progressing in line with the increase in data transmission capacity. On the other hand, in a network using a single-core fiber, optical switches are deployed in case of failures in optical networks. This optical switch can perform switching of optical paths in the single-core fiber network. However, the multi-core fiber has a challenge that the switching cannot be performed with switches for the single-core fiber.

An object of the present disclosure is to provide an optical fiber bundle and an optical switch that can perform switching in multi-core fiber systems.

DESCRIPTION OF EMBODIMENT OF PRESENT DISCLOSURE

First, embodiments of an optical fiber bundle and an optical switch according to the present disclosure will be listed and described. The optical fiber bundle according to one embodiment includes (1) four or more multi-core fibers and a ferrule for bundling and holding the four or more multi-core fibers. In the cross section where, among the four or more multi-core fibers, the first multi-core fiber, the second multi-core fiber, the third multi-core fiber, and the fourth multi-core fiber are cut along a plane perpendicular to the direction in which each multi-core fiber extends, the lines connecting the center positions of the outer shapes of each of the multi-core fibers are arranged in a square shape. In the cross section, the first multi-core fiber and the second multi-core fiber are aligned in this order along the first direction, and the first multi-core fiber and the fourth multi-core fiber are aligned in this order along the second direction perpendicular to the first direction, and the fourth multi-core fiber and the third multi-core fiber are aligned in this order along the first direction. In the cross section, the arrangement of cores of the first multi-core fiber and the arrangement of cores of the second multi-core fiber are the same as each other; the arrangement of cores of the third multi-core fiber and the arrangement of cores of the fourth multi-core fiber are the same as each other; and the arrangement of the cores of the first multi-core fiber when the first multi-core fiber is rotated 180° in the circumferential direction of the first multi-core fiber is the same as the arrangement of the cores of the fourth multi-core fiber.

In this optical fiber bundle, the light emitted from each core of the first multi-core fiber is reflected by, for example, a mirror and is incident on each core of the third multi-core fiber. When a prism is interposed between the optical fiber bundle and the mirror, the light emitted from each core of the first multi-core fiber is incident on each core of the fourth multi-core fiber adjacent to the third multi-core fiber. Thus, by inserting and ejecting the prism between the optical fiber bundle and the mirror, a connection destination of the light emitted from the first multi-core fiber can be selected from the third multi-core fiber or the fourth multi-core fiber. Furthermore, when the multi-core fiber for emitting light is changed from the first multi-core fiber, the multi-core fiber of the connection destination can be changed. Therefore, the connection destination in the multi-core fiber can be switched. In this manner, since the multi-core fiber of the connection destination can be selected, the range of selection of optical fibers with good optical characteristics can be widened.

(2) In (1) above, the ferrule may have one optical fiber holding hole into which the four or more multi-core fibers are inserted. In the cross-section, the optical fiber holding hole may exhibit a rectangular shape. In this case, a rectangular includes a square. Since the optical fiber holding hole exhibits a rectangular shape, the position of each multi-core fiber when rotated can be easily grasped.

(3) In (1) above, the ferrule may have one optical fiber holding hole into which the four or more multi-core fibers are inserted, and the optical fiber holding hole may exhibit a circular shape in the cross section. In this case, since the optical fiber holding hole exhibits a circular shape, the optical fiber holding hole in the ferrule can be easily formed with high accuracy.

(4) In (1) above, the ferrule may have a plurality of optical fiber holding holes into which the four or more multi-core fibers are respectively inserted. In this case, each multi-core fiber can be inserted into each optical fiber holding hole and individually rotated easily.

(5) In any one of (1) to (4) above, the light may be emitted from one multi-core fiber of the first multi-core fiber, the second multi-core fiber, the third multi-core fiber, and the fourth multi-core fiber, and two multi-core fibers other than the one multi-core fiber may receive reflected light reflected by emission of the light. The arrangements of the cores of the two multi-core fibers in the cross section may be the same as each other. In this case, the connection destination of the light emitted from one multi-core fiber can be selected from the two multi-core fibers.

(6) An optical switch according to one embodiment may include the optical fiber bundle of any one of (1) to (5), a mirror reflecting light emitted from the optical fiber bundle, and a prism inserted into and ejected from an optical path of the light emitted from the optical fiber bundle. In this case, the light emitted from one of the plurality of multi-core fibers bundled in the optical fiber bundle is reflected by the mirror and coupled to the multi-core fiber different from the one multi-core fiber. And in a case where the prism is inserted between the optical fiber bundle and the mirror, the light emitted from that the one multi-core fiber is coupled to a multi-core fiber that is further different than the different multi-core fiber. Therefore, the multi-core fiber of the connection destination can be switched by inserting and ejecting of the prism.

Details of Embodiment of Present Disclosure

Specific examples of an optical fiber bundle and an optical switch according to an embodiment of the present disclosure will be described below with reference to the drawings. It is noted that the present invention is not limited to the following examples, but is intended to include all modifications indicated in the scope of claims and within the scope of equivalents to the scope of claims. In the description of the drawings, the same or corresponding elements are denoted by the same reference numerals, and duplicate descriptions are omitted as appropriate. The drawings may be partially simplified or exaggerated to facilitate understanding, and dimensional ratios and the like are not limited to those described in the drawings.

Figure 1:
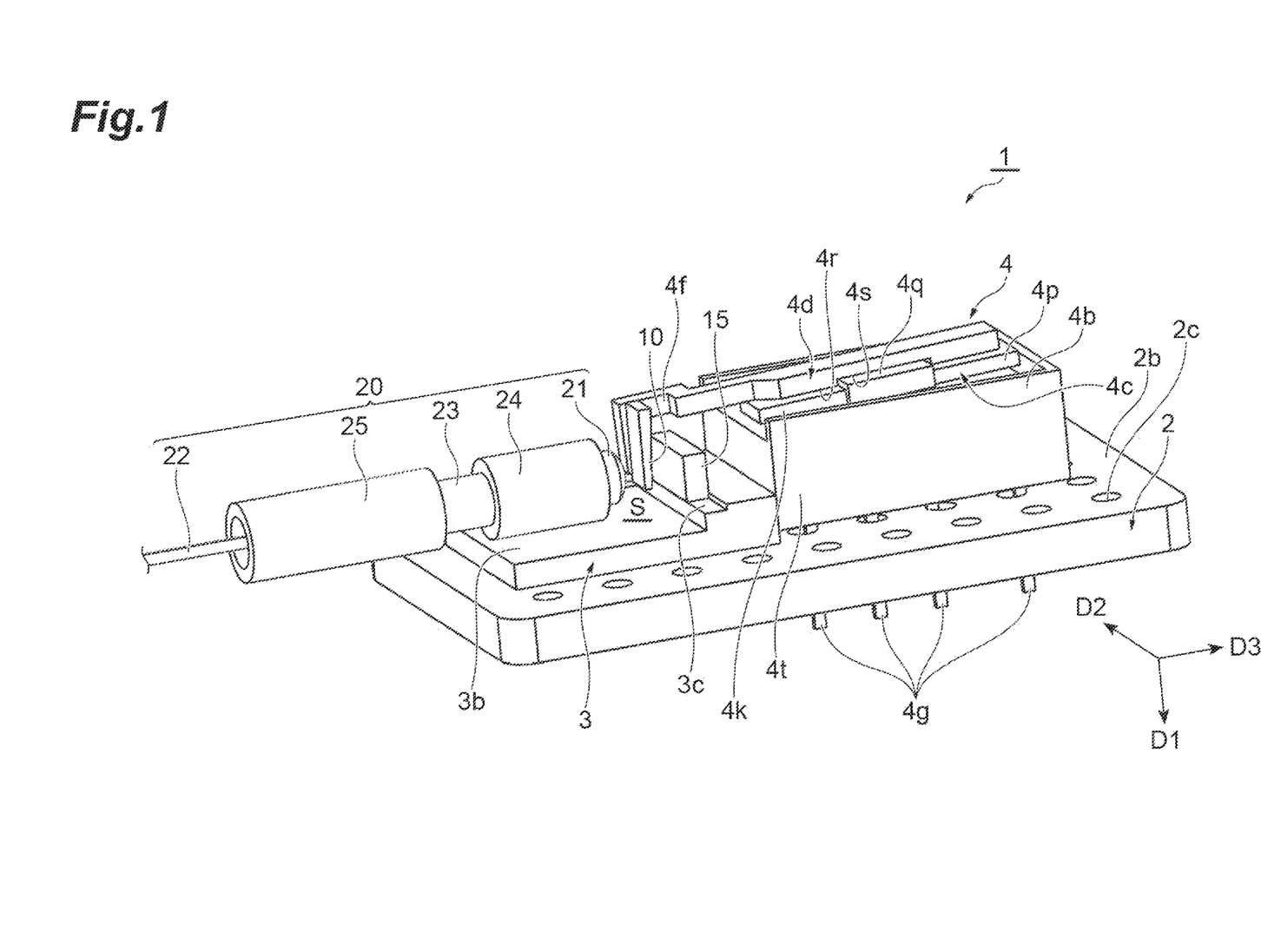
FIG. 1 is a perspective view illustrating an optical switch according to an embodiment.
Figure 2:
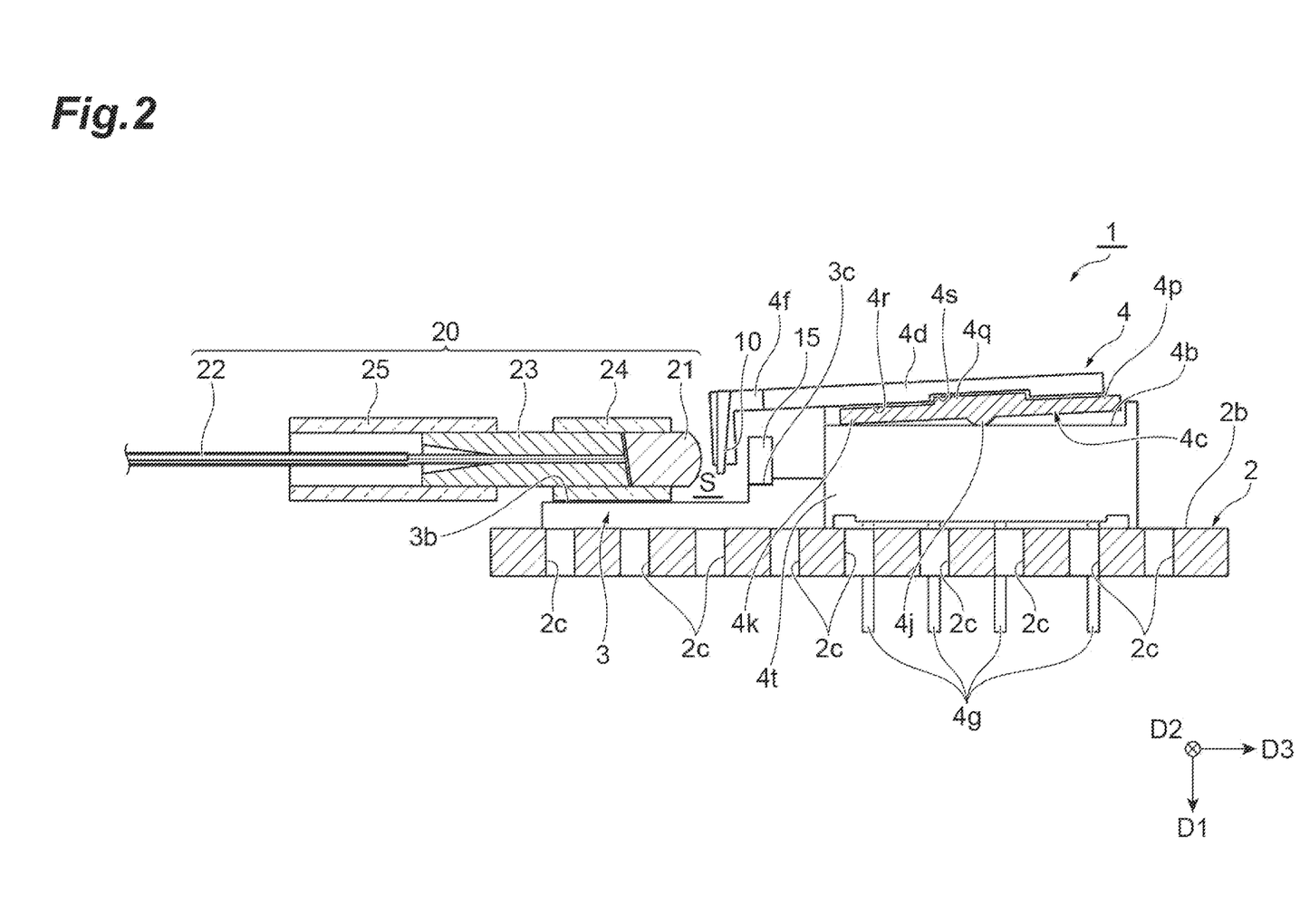
FIG. 2 is a cross-sectional view illustrating the optical switch in FIG. 1.

FIG. 1 is a perspective view illustrating an optical switch 1 as an example. FIG. 2 is a longitudinal sectional view illustrating the optical switch 1. As illustrated in FIGS. 1 and 2, the optical switch 1 includes, for example, a first substrate 2, a second substrate 3 and a prism insertion/ejection device 4 mounted on the first substrate 2. The first substrate 2 has a thickness in a first direction D1. The first substrate 2 has a main face 2*b* extending in a second direction D2 intersecting the first direction D1 and in a third direction D3 intersecting both the first direction D1 and the second direction D2. In the embodiment, the first direction D1 is a thickness direction of the first substrate 2, the second direction D2 is a lateral direction of the first substrate 2, and the third direction D3 is a longitudinal direction of the first substrate 2. As an example, the first direction D1, the second direction D2, and the third direction D3 are perpendicular to each other.

The second substrate 3 and the prism insertion/ejection device 4 are mounted on the main face 2*b* of the first substrate 2. On the main face 2*b*, the second substrate 3 and the prism insertion/ejection device 4 are aligned along the third direction D3. The prism insertion/ejection device 4 has, for example, a function equivalent to that of an electromagnetic relay (electromagnetic relay device). In this case, the prism insertion/ejection device 4 has an electromagnet unit 4*b*, a rocking member 4*c* rocking by receiving a driving force of the electromagnet unit 4*b*, and a plurality of electrodes 4*g* protruding from the electromagnet unit 4*b*.

The electromagnet unit 4*b* has, for example, an electromagnet (not illustrated), a spring (not illustrated) biasing the rocking member 4*c*, and a housing 4*t* accommodating the electromagnet and the spring. The electrode 4*g* applies a voltage to the electromagnet of the electromagnet unit 4*b*. The prism insertion/ejection device 4 further includes an arm 4*d* extending from the electromagnet unit 4*b* and the rocking member 4*c* toward the second substrate 3 and a prism 10. The arm 4*d* has an extending portion 4*f* which is a portion extending from the electromagnet unit 4*b* and the rocking member 4*c*, and the prism 10 is attached to the extending portion 4*f*.

For example, the first substrate 2 is a perforated substrate. In this case, the first substrate 2 has a plurality of through holes 2c penetrating the first substrate 2 in the first direction D1. For example, when the first substrate 2 is viewed along the first direction D1, the plurality of through holes 2c are arranged in a grid pattern. The electrode 4g of the prism insertion/ejection device 4 is passed through one of the plurality of through holes 2c. The electrode 4g is provided for applying a voltage to the electromagnet unit 4b. That is, the plurality of electrodes 4g apply the voltage from the outside of the optical switch 1 to the electromagnet unit 4b.

Hereinafter, the direction in which the electrode 4g extends from the electromagnet unit 4b will be referred to as "lower", "downward" or "lower side", and the direction opposite to the direction in which the electrode 4g extends from the electromagnet unit 4b will be referred to as "upper", "upward", or "upper side". However, these directions are for the convenience of description, and do not limit the arrangement position or direction of each component.

For example, the electromagnet unit 4b has a box shape. For example, the rocking member 4c has a fulcrum 4j fixed to an upper face of the electromagnet unit 4b positioned on the side opposite to the electrode 4g, a first rocking portion 4k extending from the fulcrum 4j toward the prism 10, and a second rocking portion 4p extending from the fulcrum 4j in the direction opposite to the first rocking portion 4k. For example, the rocking member 4c has a protrusion portion 4q protruding upward, and the arm 4d is fixed to the protrusion portion 4q. More specifically, the arm 4d has a lower face 4r facing the rocking member 4c and a recessed portion 4s recessed from the lower face 4r, and the arm 4d is fixed to the rocking member 4c in a state where the protrusion portion 4q of the rocking member 4c is fitted into the recessed portion 4s.

An example of the operation of the rocking member 4c will be described. The above-described electromagnet of the electromagnet unit 4b attracts the first rocking portion 4k when voltage is applied, and for example, the above-described spring of the electromagnet unit 4b biases the second rocking portion 4p downward. When voltage is applied to the electromagnet unit 4b, the first rocking portion 4k is attracted to the electromagnet unit 4b by the magnetic force of the electromagnet. When the first rocking portion 4k is attracted to the electromagnet unit 4b, the first rocking portion 4k, the extending portion 4f, and the prism 10 move downward with respect to the fulcrum 4j. When electric conduction to the electromagnet unit 4b is stopped, a biasing force of the spring causes the second rocking portion 4p to move downward with respect to the fulcrum 4j. When the second rocking portion 4p moves downward with respect to the fulcrum 4j, the first rocking portion 4k, the extending portion 4f, and the prism 10 move upward. Although the above-described is an electromagnet unit that can obtain two positions (states) with one electromagnet and a spring, an electromagnet unit where two electromagnets are mounted and two positions with a positive voltage and a negative voltage are obtained may be used.

The second substrate 3 is arranged, for example, below the extending portion 4f and the prism 10. The optical switch 1 further includes a mirror 15 and an optical fiber bundle 20 mounted on the second substrate 3. The optical fiber bundle 20 constitutes, for example, a collimator. A prism insertion/ejection space S which the prism 10 is inserted into and ejected from is formed between the optical fiber bundle and the mirror 15. The prism 10 moved downward is inserted into the prism insertion/ejection space S. The prism 10 is ejected from the prism insertion/ejection space S by moving the prism 10 upward.

The second substrate 3 has a first mounting surface 3b on which the optical fiber bundle 20 is mounted and a second mounting surface 3c on which the mirror 15 is mounted. The second mounting surface 3c is formed between the first mounting surface 3b and the electromagnet unit 4b. Each of the first mounting surface 3b and the second mounting surface 3c extends in both the second direction D2 and the third direction D3. For example, a height of the second mounting surface 3c with respect to the main face 2b of the first substrate 2 is higher than a height of the first mounting surface 3b with respect to the main face 2b of the first substrate 2. The mirror 15 is fixed to the second mounting surface 3c with an adhesive, and the optical fiber bundle 20 is fixed to the first mounting surface 3b with an adhesive.

The optical fiber bundle 20 has a lens 21 facing the mirror 15 or the prism 10, a plurality of multi-core fibers 22 positioned on the opposite side of the mirror 15 or the prism 10 as seen from the lens 21, and a cylindrical ferrule 23 holding the plurality of multi-core fibers 22. FIGS. 1 and 2 illustrate the plurality of multi-core fibers 22 in a simplified manner. The optical fiber bundle 20 further has a first glass tube 24 holding the lens 21 and the ferrule 23, and a second glass tube 25 holding the ferrule 23 at a position far from the mirror 15 when viewed from the first glass tube 24. The second glass tube 25 is provided to facilitate gripping the optical fiber bundle 20 by the hand. However, the second glass tube 25 can be omitted.

Figure 3:
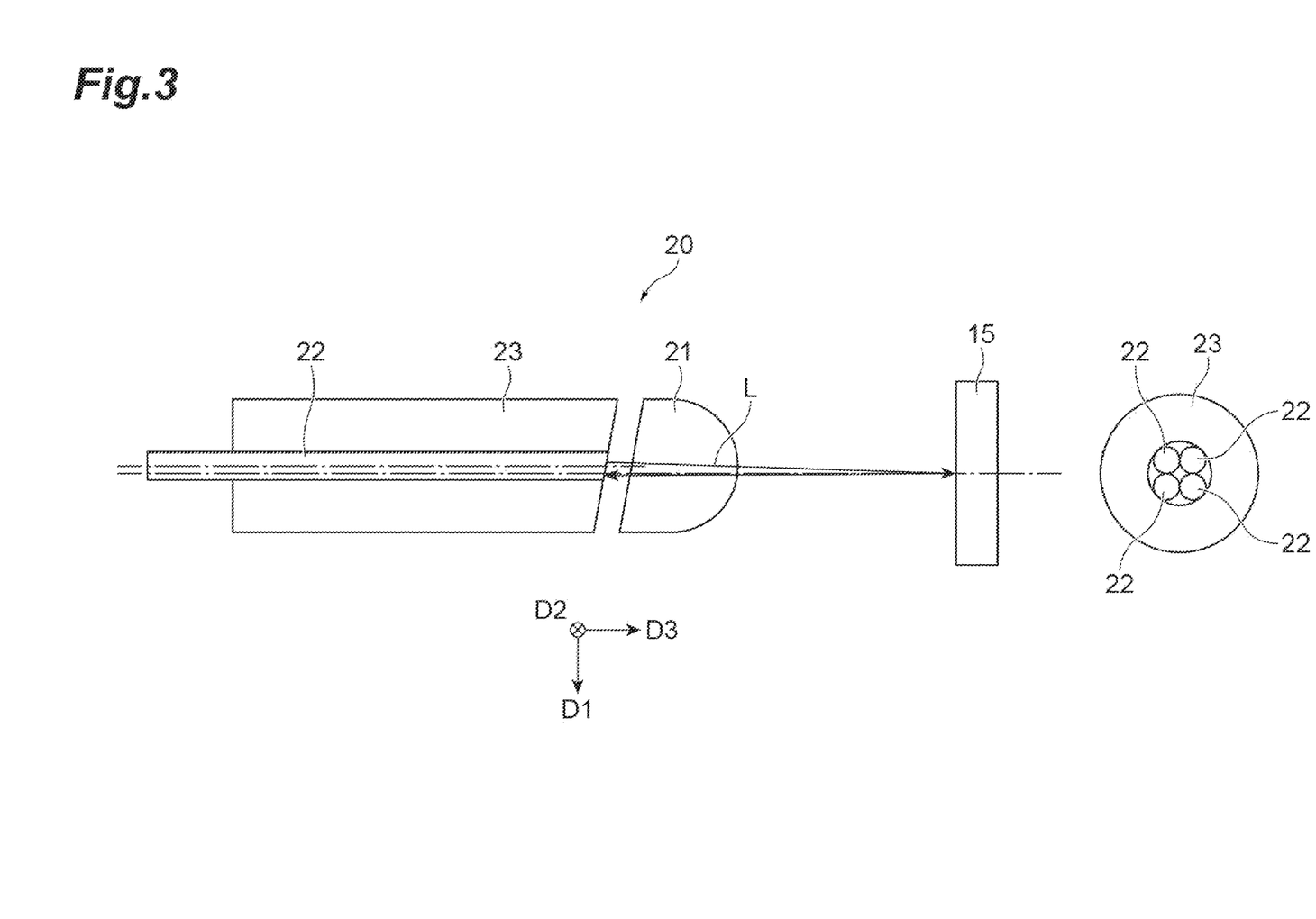
FIG. 3 is a diagram schematically illustrating an optical path of the optical switch in FIG. 1.
Figure 4:
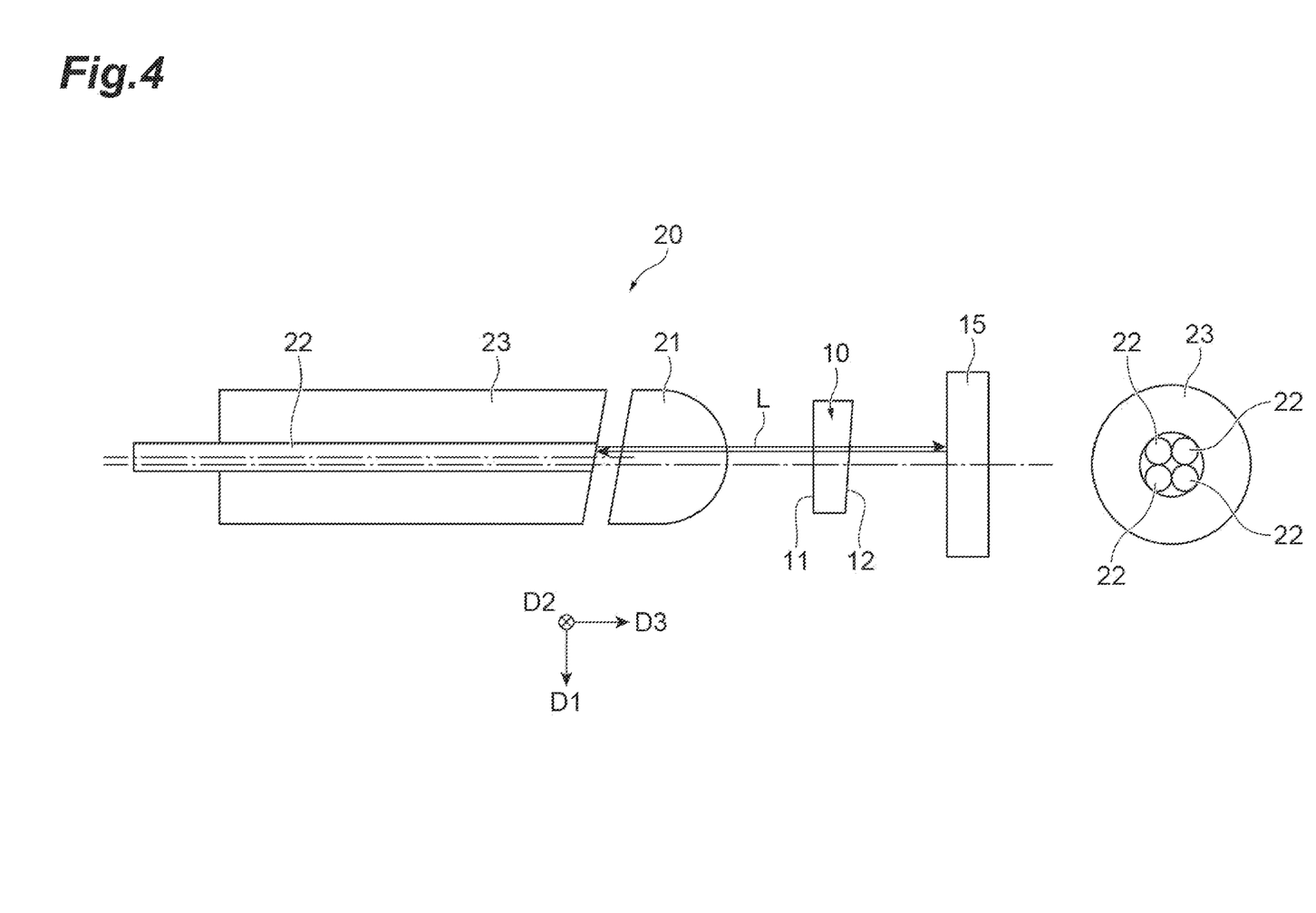
FIG. 4 is a diagram schematically illustrating the optical path of the optical switch in FIG. 1.

FIGS. 3 and 4 are diagrams schematically illustrating an optical system of the optical fiber bundle 20 when the prism 10 is inserted and ejected. As illustrated in FIGS. 3 and 4, in the optical fiber bundle 20, the light L is emitted to the mirror 15 or the prism 10 by one multi-core fiber of the plurality of multi-core fibers 22 via the lens 21. For example, the prism 10 has a first face 11 on which the light L from the optical fiber bundle 20 is incident and a second face 12 facing in the direction opposite to the first face 11 and on which the light L from the mirror 15 is incident. The first face 11 extends in both the first direction D1 and the second direction D2. The second face 12 extends in the second direction D2 and extends in a direction inclined with respect to the first direction D1. The second face 12 is inclined in the first direction D1 so that the thickness of the prism 10 decreases as the second face 12 is directed downward.

Figure 5:
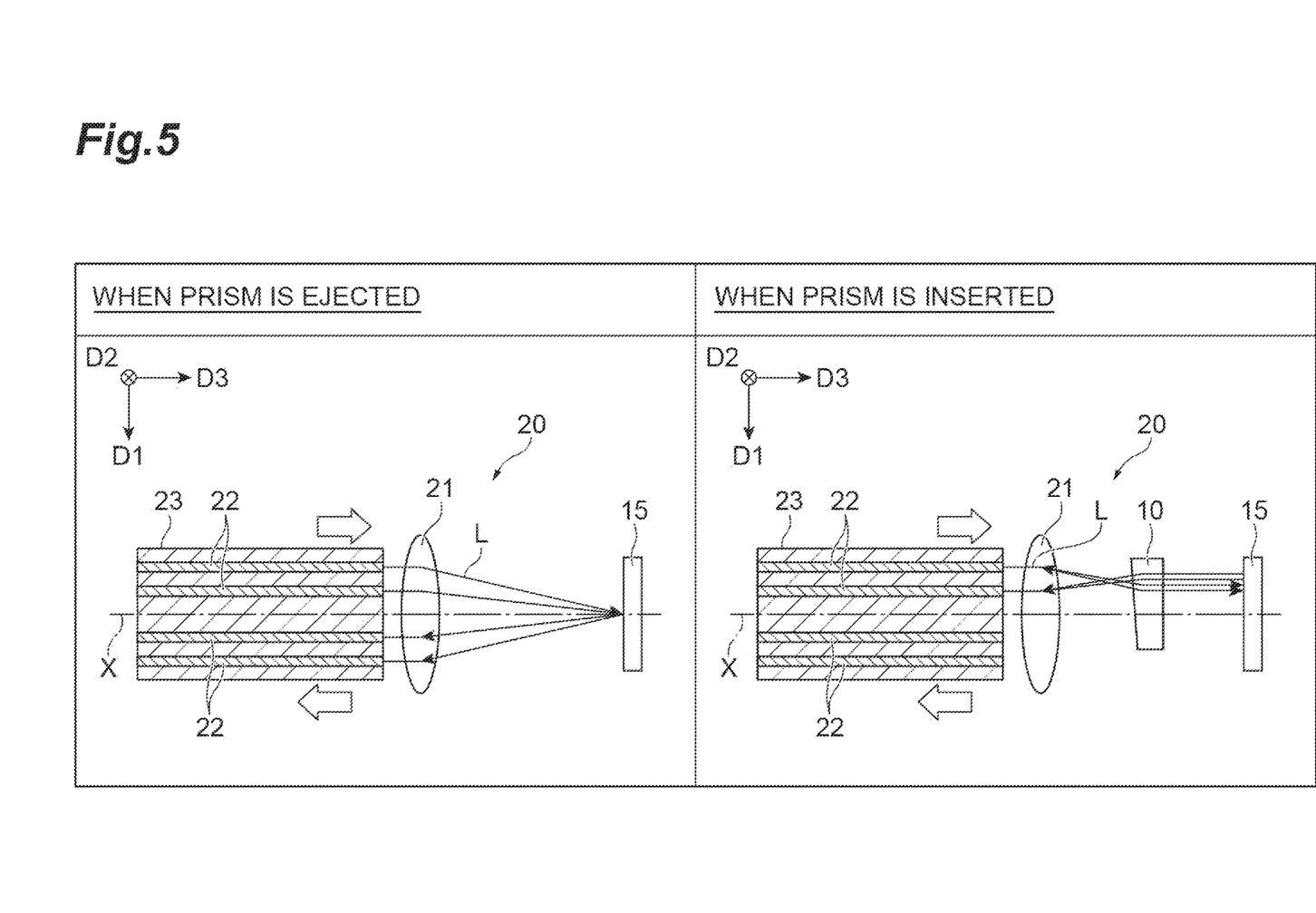
FIG. 5 is a diagram schematically illustrating the optical paths when a prism is ejected and when a prism is inserted.

FIG. 5 is an enlarged schematic diagram illustrating the optical system of the optical fiber bundle 20 when the prism 10 is ejected from the prism insertion/ejection space S and when the prism 10 is inserted into the prism insertion/ejection space S. As illustrated in FIGS. 3 and 5, in a state where the prism 10 is ejected, when the multi-core fiber 22 positioned above the axial line X of the ferrule 23 emits the light L, the light L reflected by the mirror 15 is incident on the multi-core fiber 22 positioned below the axial line X. At this time, the multi-core fiber 22 on which the light L is incident and the multi-core fiber 22 from which the light L is emitted are arranged at position to be symmetrical to each other with respect to the axial line X.

As illustrated in FIGS. 4 and 5, in a state where the prism 10 is inserted into the prism insertion/ejection space S, when the multi-core fiber 22 positioned above the axial line X emits the light L, the light L reflected by the mirror 15 is incident on the multi-core fiber 22 positioned above the axial line X. At this time, the position of the multi-core fiber 22 on which the light L is incident in the first direction D1 and the position of the multi-core fiber 22 from which the light L is emitted in the first direction D1 are the same as each other.

Figure 6:
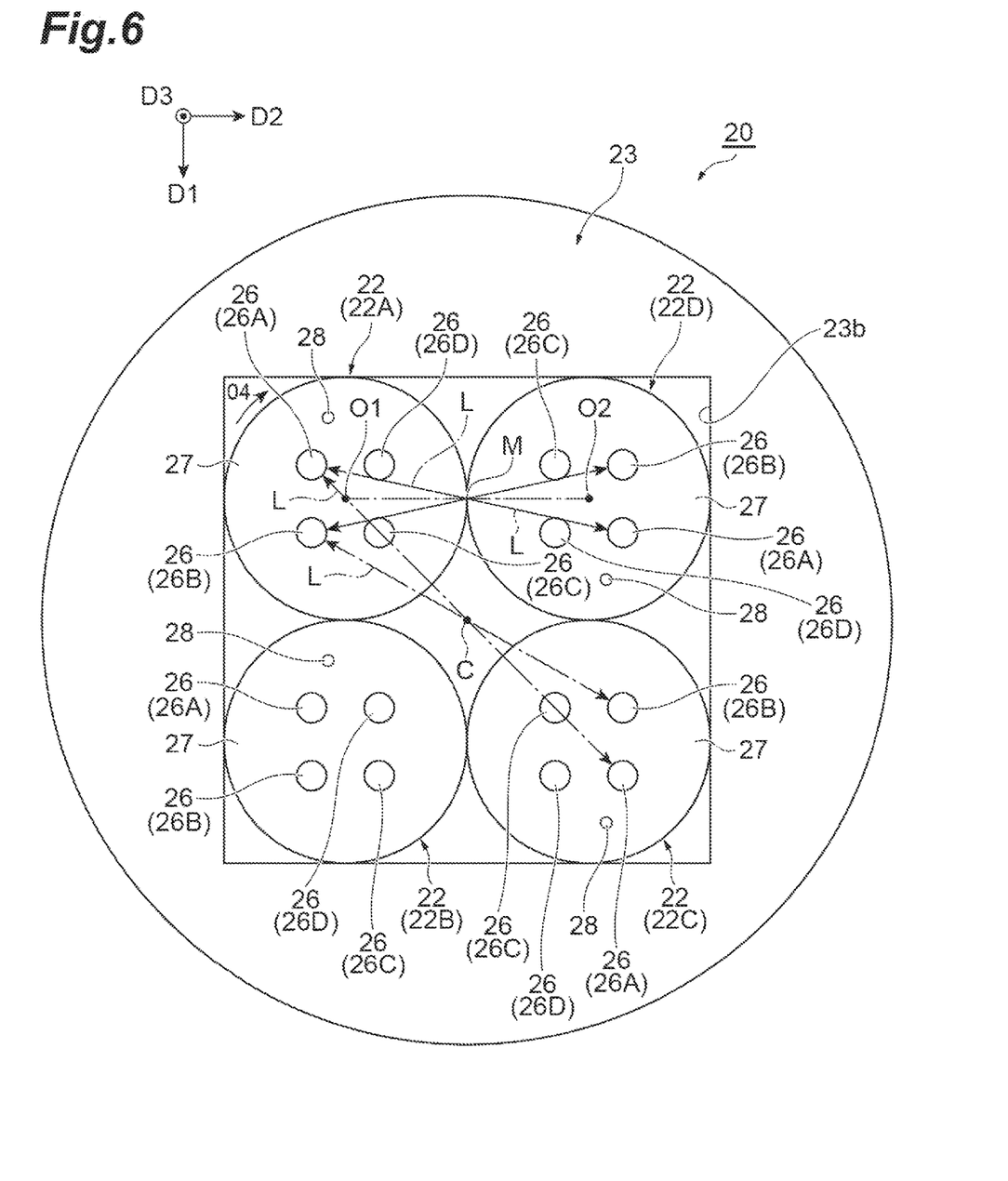
FIG. 6 is a diagram illustrating a cross section of an optical fiber bundle according to the embodiment.

FIG. 6 illustrates a cross section (hereinafter sometimes simply referred to as "cross section") when the optical fiber bundle 20 is cut along a plane perpendicular to the direction in which each multi-core fiber 22 extends. As illustrated in FIG. 6, the optical fiber bundle 20 has the four or more multi-core fibers 22 and the ferrule 23 bundling and holding the four or more multi-core fibers 22. It is noted that FIG. 6 illustrates an example in which the number of multi-core fibers 22 is four.

The ferrule 23 has an optical fiber holding hole 23b into which, for example, four multi-core fibers 22 are inserted. The optical fiber holding hole 23b exhibits a rectangular cross section. The optical fiber holding hole 23b is filled with an adhesive for fixing the multi-core fiber 22 to the ferrule 23. As an example, the optical fiber holding hole 23b in the cross section has a square shape.

In the cross section, among the four multi-core fibers 22, a first multi-core fiber 22A, a second multi-core fiber 22B, a third multi-core fiber 22C, and a fourth multi-core fiber 22D are arranged so that lines connecting the center positions of the outer shapes of each of the multi-core fibers 22 forms a square shape. Hereinafter, when it is not necessary to identify and describe the first multi-core fiber 22A, the second multi-core fiber 22B, the third multi-core fiber 22C, and the fourth multi-core fiber 22D, these components are described as the multi-core fiber 22.

In the cross section, the first multi-core fiber 22A and the second multi-core fiber 22B are aligned in this order along the first direction D1, and the first multi-core fiber 22A and the fourth multi-core fiber 22D are aligned in this order along the second direction D2. Furthermore, in the cross section, the fourth multi-core fiber 22D and the third multi-core fiber 22C are aligned in this order along the first direction D1.

Each multi-core fiber 22 has a plurality of cores 26 extending along the third direction D3 and a clad 27 covering the plurality of cores 26. For example, the plurality of cores 26 are a first core 26A, a second core 26B, a third core 26C, and a fourth core 26D arranged so that the lines connecting the core center positions of the plurality of cores 26 in the cross section form a square shape.

For example, the multi-core fiber 22 may have markers 28 for identifying the first core 26A, the second core 26B, the third core 26C, and the fourth core 26D. It is recognized that, from the positions of the markers 28 and the position of each core 26 in the cross section, which core 26 among the plurality of cores 26 is the first core 26A, the second core 26B, the third core 26C, or the fourth core 26D.

In each cross section of the first multi-core fiber 22A and the second multi-core fiber 22B, the first core 26A and the second core 26B are aligned in this order along the first direction D1, and the first core 26A and the fourth core 26D are aligned in this order along the second direction D2. In each cross section of the first multi-core fiber 22A and the second multi-core fiber 22B, the fourth core 26D and the third core 26C are aligned in this order along the first direction D1.

On the other hand, in each cross section of the third multi-core fiber 22C and the fourth multi-core fiber 22D, the first core 26A and the second core 26B are aligned in this order along the direction opposite to the first direction D1, and the first core 26A and the fourth cores 26D are aligned in this order along the direction opposite to the second direction D2. In each cross section of the third multi-core fiber 22C and the fourth multi-core fiber 22D, the fourth core 26D and the third core 26C are aligned in this order along the direction opposite to the first direction D1.

As described above, in the cross section, the arrangement of the cores 26 of the first multi-core fiber 22A and the arrangement of the cores 26 of the second multi-core fiber 22B are the same as each other; and the arrangement of the cores 26 of the third multi-core fiber 22C and the arrangement of the cores 26 of the fourth multi-core fiber 22D is the same as each other. And the arrangement of the cores 26 of the first multi-core fiber 22A when the first multi-core fiber 22A is rotated 180° in a circumferential direction D4 of the first multi-core fiber 22A is the same as the arrangement of the cores 26 of the fourth multi-core fiber 22D.

The incidence and emission of the light L on the multi-core fiber 22 will be described in more detail. When the first core 26A of the first multi-core fiber 22A emits the light L in a state where the prism 10 ejected, the light L reflected by the mirror 15 is incident on the first core 26A of the third multi-core fiber 22C. In this state, when the second core 26B of the first multi-core fiber 22A emits the light L, the light L reflected by the mirror 15 is incident on the second core 26B of the third multi-core fiber 22C. In this case, the multi-core fiber 22 of the connection destination of the first multi-core fiber 22A becomes the third multi-core fiber 22C.

As described above, the light L emitted from the first core 26A of the multi-core fiber 22 is incident on the first core 26A of the multi-core fiber 22 different from the multi-core fiber 22. Similarly, the light L emitted from the second core 26B, the third core 26C, or the fourth core 26D of the multi-core fiber 22 is incident on the second core 26B, the third core 26C, or the fourth core 26D of the multi-core fiber 22 different from the multi-core fiber 22.

In addition, in the state where the prism 10 is ejected, each core 26 of the multi-core fiber 22 (for example, the third multi-core fiber 22C) into which the light L is incident and each core 26 of the multi-core fiber 22 (for example, the first multi-core fiber 22A) from which the light L is emitted are arranged at positions to be point-symmetrical to each other with respect to the center C of the cross section. Hereinafter, the multi-core fiber 22 into which the light L is incident may be referred to as a connection destination port, and the multi-core fiber 22 from which the light L is emitted may be referred to as a common port.

On the other hand, in a state where the prism 10 is inserted, when the first core 26A of the first multi-core fiber 22A emits the light L, the light L reflected by the mirror 15 is incident on the first core 26A of the fourth multi-core fiber 22D. In this state, when the second core 26B of the first multi-core fiber 22A emits the light L, the light L reflected by the mirror 15 is incident on the second core 26B of the fourth multi-core fiber 22D. In this case, the multi-core fiber 22 of the connection destination of the first multi-core fiber 22A becomes the fourth multi-core fiber 22D.

In the state where the prism 10 is inserted, the light L emitted from the first core 26A of the multi-core fiber 22 is incident on the first core 26A of the multi-core fiber 22 adjacent to the multi-core fiber 22 along the second direction D2. Similarly, the light L emitted from the second core 26B, the third core 26C, or the fourth core 26D of the multi-core fiber 22 is incident on the second core 26B, the third core 26C, or the fourth core 26D of the multi-core fiber 22 adjacent to the multi-core fiber 22 along the second direction D2.

As described above, in the state where the prism 10 is ejected, each core 26 of the common port and each core 26 of the connection destination port are arranged at positions to be point-symmetrical to each other with respect to the center C of the cross section. On the other hand, in the state where the prism 10 is inserted, each core 26 of the common port and each core 26 of the connection destination port are arranged at positions to be point-symmetrical to each other with respect to the middle point M of the line segment connecting a center O1 of the common port and a center O2 of the connection destination port.

Figure 7:
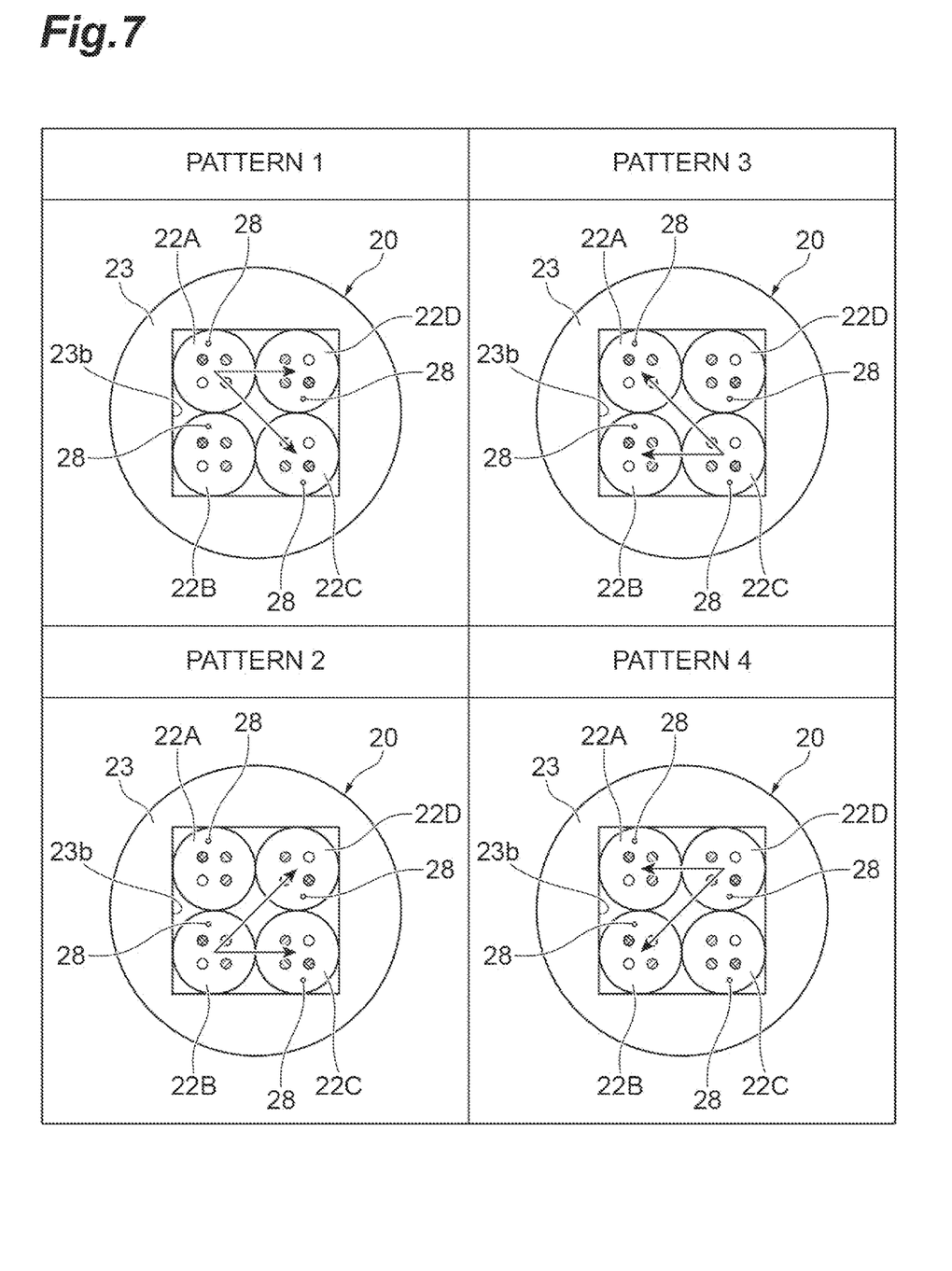
FIG. 7 is a diagram schematically illustrating a pattern of optical paths in the optical fiber bundle according to the embodiment.

As described above, the connection destination port is switched by inserting and ejecting the prism 10 into and from the prism insertion/ejection space S. FIG. 7 illustrates examples of patterns of common port and connection destination port. In the following description, the connection destination port in which the prism 10 is ejected is referred to as a first connection destination port, and the connection destination port in which the prism 10 is inserted is referred to as a second connection destination port.

In pattern 1, the first multi-core fiber 22A is the common port, the third multi-core fiber 22C is the first connection destination port, and the fourth multi-core fiber 22D is the second connection destination port. At this time, the second multi-core fiber 22B is a dummy port. The dummy port is the multi-core fiber 22 through which the light L is not incident on and emitted from. The common port, the first connection destination port, the second connection destination port, and the dummy port are selectable. For example, in pattern 4, the fourth multi-core fiber 22D is the common port, the second multi-core fiber 22B is the first connection destination port, the first multi-core fiber 22A is the second connection destination port, and the third multi-core fiber 22C is the dummy port.

By changing the orientation of the prism 10 to be inserted, the first connection destination port and the second connection destination port can be switched. That is, in the above-described example, the prism 10 inclined so that the thickness of the prism 10 decreases as the second face 12 on which the light L from the mirror 15 is incident is directed downward is inserted and ejected. However, the prism 10 inclined so that the thickness of the prism 10 increases as the second face 12 is directed downward may be inserted and ejected.

That is, the prism 10 that becomes upside down may be inserted and ejected. In this case, for example, in pattern 2, the second multi-core fiber 22B is the common port, the fourth multi-core fiber 22D is the first connection destination port, the third multi-core fiber 22C is the second connection destination port, and the first multi-core fiber 22A is the dummy port. In pattern 3, the third multi-core fiber 22C is the common port, the first multi-core fiber 22A is the first connection destination port, the second multi-core fiber 22B is the second connection destination port, and the fourth multi-core fiber 22D is the dummy port.

Next, the functions and effects obtained from the optical fiber bundle 20 and the optical switch 1 according to this embodiment will be described. In the optical fiber bundle 20, for example, the light emitted from each core 26 of the first multi-core fiber 22A is reflected by the mirror 15 and is incident on each core 26 of the third multi-core fiber 22C. When the prism 10 is interposed between the optical fiber bundle 20 and the mirror 15, the light L emitted from each core 26 of the first multi-core fiber 22A is incident on each core 26 of the fourth multi-core fiber 22D adjacent to the third multi-core fiber 22C. Thus, by inserting and ejecting the prism 10 between the optical fiber bundle 20 and the mirror 15, the connection destination of the light L emitted from the first multi-core fiber 22A can be selected from the third multi-core fiber 22C or the fourth multi-core fiber 22D.

Furthermore, when the multi-core fiber 22 (common port) through which the light L is emitted is changed from the first multi-core fiber 22A, the multi-core fiber 22 (connection destination port) of the connection destination can be changed. Therefore, the connection destination in the multi-core fiber 22 can be switched. In this manner, since the multi-core fiber 22 of the connection destination can be selected, the range of selection of optical fibers with good optical characteristics can be widened.

As described above, the ferrule 23 may have optical fiber holding holes 23b into which the four or more multi-core fibers 22 are inserted. In the cross section, the optical fiber holding hole 23b may exhibit a rectangular shape. In this case, the optical fiber holding hole 23b exhibits a rectangular shape, the position of each multi-core fiber 22 when rotated can be easily grasped.

As described above, the light L is emitted from one multi-core fiber 22 among the first multi-core fiber 22A, the second multi-core fiber 22B, the third multi-core fiber 22C, and the fourth multi-core fiber 22D, and the two multi-core fibers 22 other than the one multi-core fiber 22 receive reflected light reflected by emission of the light L. And the arrangements of the cores 26 of the two multi-core fibers 22 in the cross section are the same as each other. In this case, the connection destination of the light L emitted from one multi-core fiber 22 can be selected from the two multi-core fibers 22.

The optical switch 1 according to this embodiment includes an optical fiber bundle 20, a mirror 15 reflecting the light L emitted from the optical fiber bundle 20, and a prism 10 inserted into and ejected from the optical path of the light L emitted from the optical fiber bundle 20. In this case, the light L emitted from one of the plurality of multi-core fibers 22 bundled in the optical fiber bundle 20 is reflected by the mirror 15 and coupled to the multi-core fiber 22 different from the one multi-core fiber. Then, when the prism 10 is inserted between the optical fiber bundle 20 and the mirror 15, the light L emitted from the one multi-core fiber 22 is coupled to the multi-core fiber 22 different from the other multi-core fiber 22. Therefore, the multi-core fiber 22 of the connection destination can be switched by inserting and ejecting the prism 10.

Next, modifications of the optical fiber bundle according to the present disclosure will be described. A portion of the configuration of the optical fiber bundle according to Modified Example is the same as a portion of the configuration of the optical fiber bundle 20 described above. Therefore, hereinafter, descriptions overlapping with the configuration of the optical fiber bundle 20 are appropriately omitted by attaching the same reference numerals.

Figure 8:
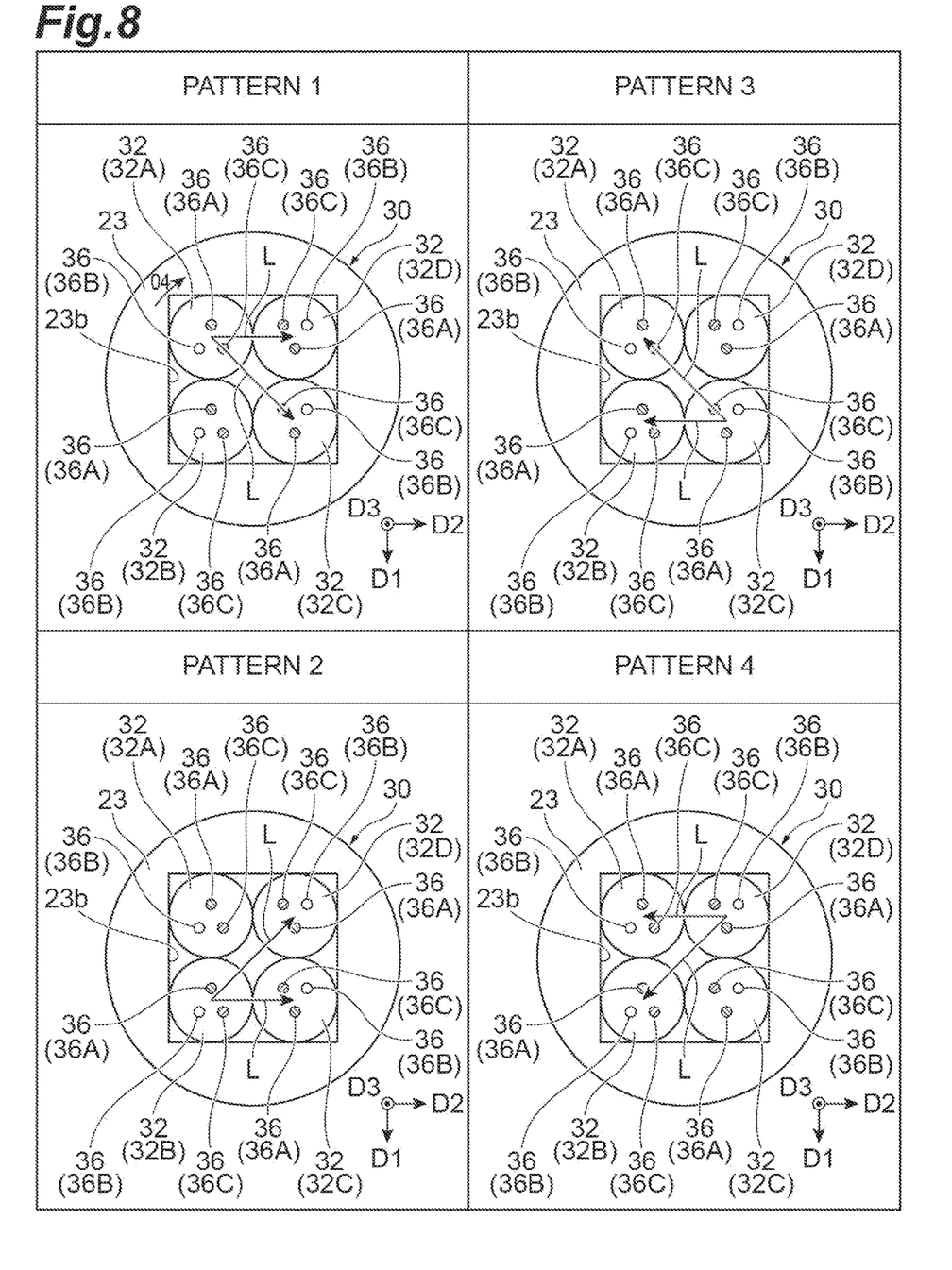
FIG. 8 is a diagram schematically illustrating a pattern of optical paths in an optical fiber bundle according to a Modified Example.

FIG. 8 is a cross-sectional view illustrating a plurality of multi-core fibers 32 and the ferrule 23 of an optical fiber bundle 30 according to Modified Example 1. Similarly to the multi-core fiber 22 described above, the plurality of multi-core fibers 32 are a first multi-core fiber 32A, a second multi-core fiber 32B, a third multi-core fiber 32C, and a fourth multi-core fiber 32D. Each multi-core fiber 32 has a plurality of cores 36 arranged differently from the cores 26 described above.

The plurality of cores 36 are a first core 36A, a second core 36B, and a third core 36C arranged so that lines connecting respective center positions of the plurality of cores 36 in the cross section form a triangular shape. As an example, the first core 36A, the second core 36B, and the third core 36C are arranged so that lines connecting the respective center positions in the cross section form an equilateral triangle. In each cross section of the first multi-core fiber 32A and the second multi-core fiber 32B, the second core 36B and the third core 36C are aligned in this order along the second direction D2, and the middle points of the line segments connecting the first core 36A and the second core 36B and the third core 36C are aligned in this order along the first direction D1.

On the other hand, in each cross section of the third multi-core fiber 32C and the fourth multi-core fiber 32D, the second core 36B and the third core 36C are aligned in this order along the direction opposite to the second direction D2, and the first core 36A and the middle point of the line segment connecting the second core 36B and the third core 36C are aligned in this order along the direction opposite to the first direction D1.

As described above, in the cross section, the arrangement of the cores 36 of the first multi-core fiber 32A and the arrangement of the cores 36 of the second multi-core fiber 32B are the same as each other; and the arrangement of the cores 36 of the third multi-core fiber 32C and the arrangement of the cores 36 of the fourth multi-core fiber 32D is the same as each other. And the arrangement of the cores 36 of the first multi-core fiber 32A when the first multi-core fiber 32A is rotated 180° in the circumferential direction D4 of the first multi-core fiber 32A is the same as the arrangement of the cores 36 of the fourth multi-core fiber 32D.

The incidence and emission of the light L on the multi-core fiber 32 are the same as the incidence and emission of the light L on the multi-core fiber 22. For example, when the first multi-core fiber 32A is the common port as in pattern 1, the third multi-core fiber 32C is the first connection destination port, and the fourth multi-core fiber 32D is the second connection destination port. And the second multi-core fiber 32B is the dummy port. In the multi-core fiber 32, in patterns 2, 3, and 4, the relationship among the common port, the first connection destination port, the second connection destination port, and the dummy port is the same as in the case of the multi-core fiber 22.

As described above, in the optical fiber bundle according to Modified Example 1, by inserting and ejecting the prism 10 between the plurality of multi-core fibers 32 and the mirror 15, the connection destination of the light L emitted from the multi-core fibers 32 can be selected from the two multi-core fibers 32. In addition, when the multi-core fiber 32 (common port) emitting the light L is changed, the multi-core fiber 32 (connection destination port) of the connection destination can be changed. Therefore, since the connection destination of the multi-core fiber 32 can be switched, the same functions and effects as in the case of the optical fiber bundle 20 can be obtained. Thus, in the optical fiber bundle and the optical switch according to the present disclosure, the number of cores and the arrangement shape of the cores of the multi-core fiber are not particularly limited.

Figure 9:
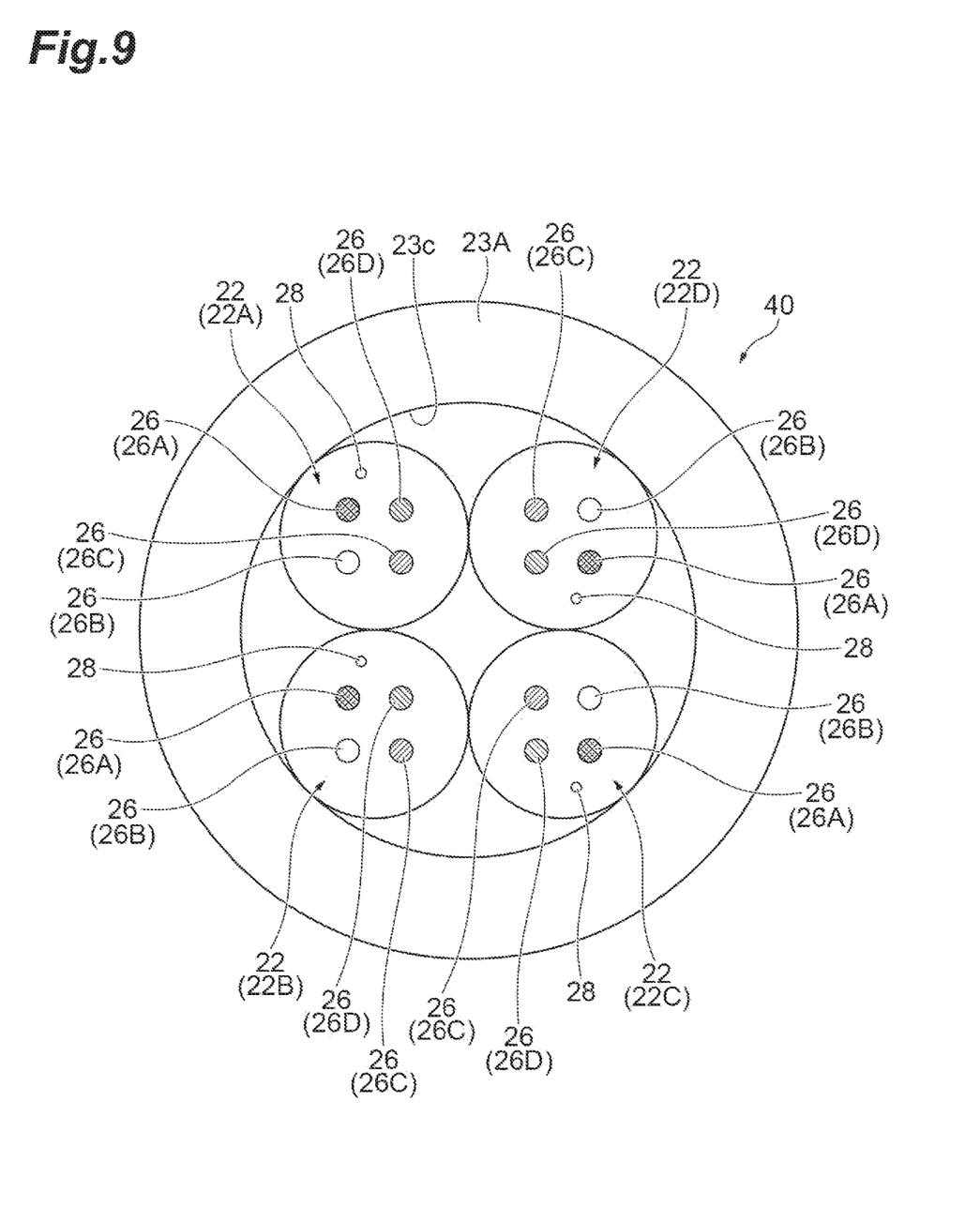
FIG. 9 is a diagram illustrating the cross section of the optical fiber bundle according to the Modified Example.

Next, an optical fiber bundle 40 according to Modified Example 2 will be described with reference to FIG. 9. As illustrated in FIG. 9, the optical fiber bundle 40 according to Modified Example 2 has a ferrule 23A different from the ferrule 23. The ferrule 23A has an optical fiber holding hole 23c into which four multi-core fibers 22 are inserted. The optical fiber holding hole 23c has a circular cross section. Others are the same as the configuration described in the above-described embodiment, and among the four multi-core fibers 22, the first multi-core fiber 22A, the second multi-core fiber 22B, the third multi-core fiber 22C, and the fourth multi-core fiber 22D are arranged so that the lines connecting the center positions of the outer shapes of the multi-core fibers 22 form a square.

As described above, in the optical fiber bundle 40 according to Modified Example 2, the optical fiber holding hole 23c exhibits a circular shape in the cross section. Therefore, since the optical fiber holding hole 23c exhibits a circular shape, the optical fiber holding hole 23c can be easily formed in the ferrule 23A with high accuracy.

Figure 10:
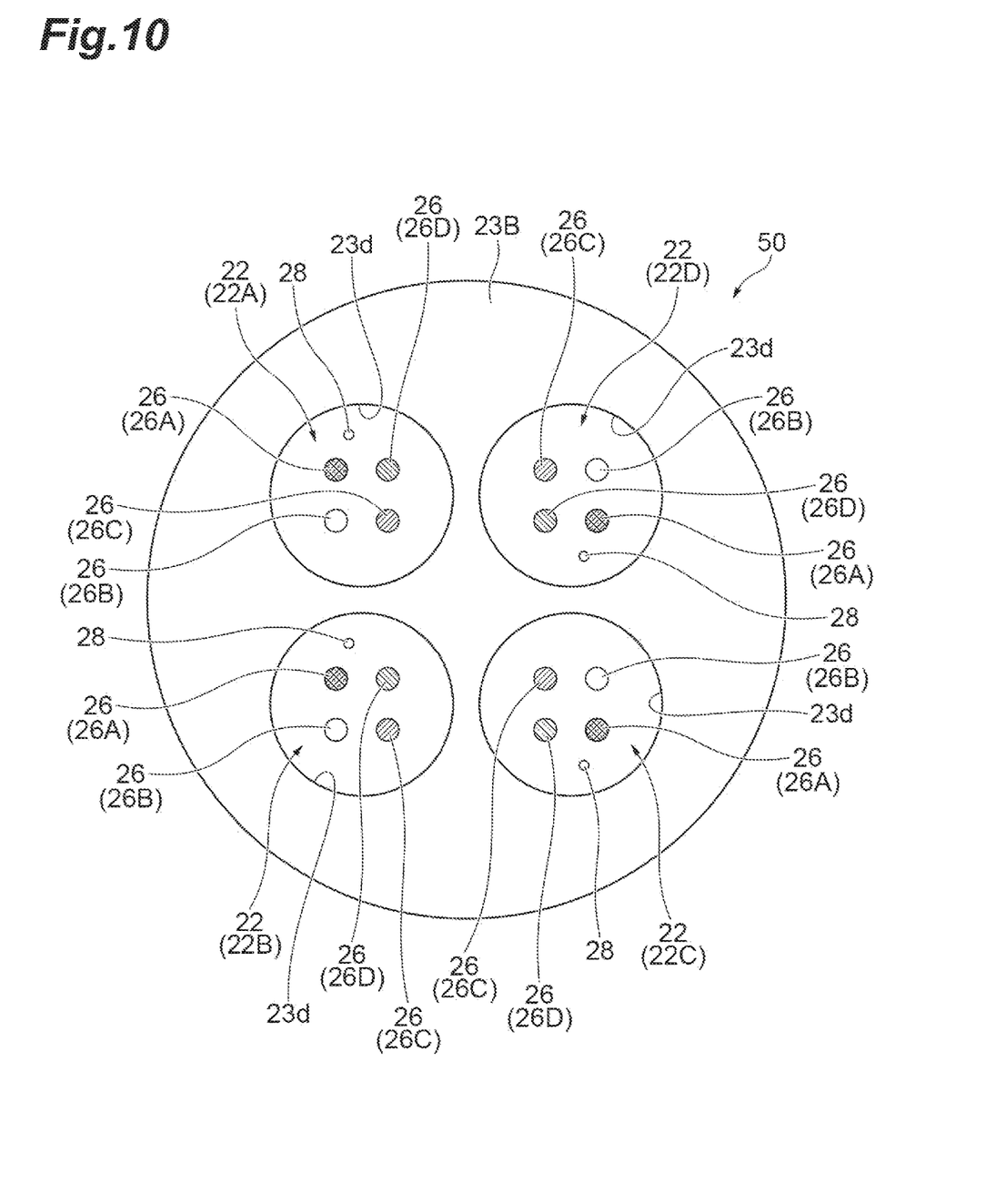
FIG. 10 is a diagram illustrating a cross section of an optical fiber bundle different from that of FIG. 9.

An optical fiber bundle 50 according to Modified Example 3 will be described with reference to FIG. 10. As illustrated in FIG. 10, the ferrule 23B has optical fiber holding holes 23d into which each multi-core fiber 22 is individually inserted. In the cross section, the four optical fiber holding holes 23d are arranged so that the lines connecting the center positions of the respective inner diameters form a square. The outer diameter of the optical fiber holding hole 23d in the cross section is 0.5 µm to 3.0 µm larger than the outer diameter of each multi-core fiber 22 in the cross section. This is so that each multi-core fiber 22 can be rotationally adjusted around the central axis within the cross section. As described above, in the case of the optical fiber bundle 50 according to Modified Example 3, the ferrule 23B has a plurality of optical fiber holding holes 23d into which the four or more multi-core fibers 22 are respectively inserted. In this case, each multi-core fiber 22 can be arranged with high accuracy within the cross section.

Heretofore, the embodiments and various modifications of the optical module according to the present disclosure have been described above. However, the invention is not limited to the embodiments or examples described above. That is, it will be readily recognized by those skilled in the art that the present invention can be modified and changed in various ways without departing from the scope of the claims. For example, the shape, size, number, material, and arrangement of each component of the optical fiber bundle and the optical switch are not limited to those contents described above and can be changed as appropriate.

For example, in the above-described embodiment, the optical fiber bundle 20 having the ferrule 23 holding the four multi-core fibers 22 is described. However, the number of multi-core fibers held by the ferrule may be larger than four. For example, the optical fiber bundle may include a plurality of dummy ports. As a specific example, one multi-core fiber 22 is a common port, two multi-core fibers 22 different from the one multi-core fiber 22 are connection destination ports, and a plurality of dummy ports other than the common port and the connection destination port may be provided. For example, any of the plurality of dummy ports may be arranged between the plurality of multi-core fibers 22 in the cross section or outside the plurality of multi-core fibers 22 in the cross section. Thus, the number and arrangement of dummy ports can be changed as appropriate.

What is claimed is:
1. An optical fiber bundle comprising:
   four or more multi-core fibers; and
   a ferrule bundling and holding the four or more multi-core fibers,
   wherein in a cross section where, among the four or more multi-core fibers, a first multi-core fiber, a second multi-core fiber, a third multi-core fiber, and a fourth multi-core fiber are cut along a plane perpendicular to a direction in which each multi-core fiber extends, lines connecting center positions of each of the multi-core fibers are arranged to form a square shape,
   wherein, in the cross section, the first multi-core fiber and the second multi-core fiber are aligned in this order along a first direction,
   wherein the first multi-core fiber and the fourth multi-core fiber are aligned in this order along a second direction perpendicular to the first direction, wherein the fourth multi-core fiber and the third multi-core fiber are aligned in this order along the first direction, wherein, in the cross section, arrangement of cores of the first multi-core fiber and arrangement of cores of the second multi-core fiber are the same as each other, wherein arrangement of cores of the third multi-core fiber and arrangement of cores of the fourth multi-core fiber are the same as each other, wherein the arrangement of the cores of the first multi-core fiber when the first multi-core fiber is rotated 180° in a circumferential direction of the first multi-core fiber is the same as the arrangement of the cores of the fourth multi-core fiber, and wherein the arrangement of the cores of the first multi-core fiber when the first multi-core fiber is rotated 0° in the circumferential direction of the first multi-core fiber is not the same as the arrangement of the cores of the fourth multi-core fiber.

2. The optical fiber bundle according to claim 1, wherein the ferrule has one optical fiber holding hole into which the four or more multi-core fibers are inserted, and wherein, in the cross section, the optical fiber holding hole exhibits a rectangular shape.

3. An optical fiber bundle comprising:

four or more multi-core fibers; and a ferrule bundling and holding the four or more multi-core fibers, wherein in a cross section where, among the four or more multi-core fibers, a first multi-core fiber, a second multi-core fiber, a third multi-core fiber, and a fourth multi-core fiber are cut along a plane perpendicular to a direction in which each multi-core fiber extends, lines connecting center positions of each of the multi-core fibers are arranged to form a square shape, wherein, in the cross section, the first multi-core fiber and the second multi-core fiber are aligned in this order along a first direction, wherein the first multi-core fiber and the fourth multi-core fiber are aligned in this order along a second direction perpendicular to the first direction, wherein the fourth multi-core fiber and the third multi-core fiber are aligned in this order along the first direction, wherein, in the cross section, arrangement of cores of the first multi-core fiber and arrangement of cores of the second multi-core fiber are the same as each other, wherein arrangement of cores of the third multi-core fiber and arrangement of cores of the fourth multi-core fiber are the same as each other, wherein the arrangement of the cores of the first multi-core fiber when the first multi-core fiber is rotated 180° in a circumferential direction of the first multi-core fiber is the same as the arrangement of the cores of the fourth multi-core fiber, wherein the ferrule has one optical fiber holding hole into which the four or more multi-core fibers are inserted, and wherein, in the cross section, the optical fiber holding hole exhibits a circular shape.

4. An optical fiber bundle comprising:

four or more multi-core fibers; and a ferrule bundling and holding the four or more multi-core fibers, wherein in a cross section where, among the four or more multi-core fibers, a first multi-core fiber, a second multi-core fiber, a third multi-core fiber, and a fourth multi-core fiber are cut along a plane perpendicular to a direction in which each multi-core fiber extends, lines connecting center positions of each of the multi-core fibers are arranged to form a square shape, wherein, in the cross section, the first multi-core fiber and the second multi-core fiber are aligned in this order along a first direction, wherein the first multi-core fiber and the fourth multi-core fiber are aligned in this order along a second direction perpendicular to the first direction, wherein the fourth multi-core fiber and the third multi-core fiber are aligned in this order along the first direction, wherein, in the cross section, arrangement of cores of the first multi-core fiber and arrangement of cores of the second multi-core fiber are the same as each other, wherein arrangement of cores of the third multi-core fiber and arrangement of cores of the fourth multi-core fiber are the same as each other, wherein the arrangement of the cores of the first multi-core fiber when the first multi-core fiber is rotated 180° in a circumferential direction of the first multi-core fiber is the same as the arrangement of the cores of the fourth multi-core fiber, and wherein the ferrule has a plurality of optical fiber holding holes into which each of the four or more multi-core fibers is inserted.

5. An optical fiber bundle comprising:

four or more multi-core fibers; and a ferrule bundling and holding the four or more multi-core fibers, wherein in a cross section where, among the four or more multi-core fibers, a first multi-core fiber, a second multi-core fiber, a third multi-core fiber, and a fourth multi-core fiber are cut along a plane perpendicular to a direction in which each multi-core fiber extends, lines connecting center positions of each of the multi-core fibers are arranged to form a square shape, wherein, in the cross section, the first multi-core fiber and the second multi-core fiber are aligned in this order along a first direction, wherein the first multi-core fiber and the fourth multi-core fiber are aligned in this order along a second direction perpendicular to the first direction, wherein the fourth multi-core fiber and the third multi-core fiber are aligned in this order along the first direction, wherein, in the cross section, arrangement of cores of the first multi-core fiber and arrangement of cores of the second multi-core fiber are the same as each other, wherein arrangement of cores of the third multi-core fiber and arrangement of cores of the fourth multi-core fiber are the same as each other, wherein the arrangement of the cores of the first multi-core fiber when the first multi-core fiber is rotated 180° in a circumferential direction of the first multi-core fiber is the same as the arrangement of the cores of the fourth multi-core fiber, wherein light is emitted from one multi-core fiber among the first multi-core fiber, the second multi-core fiber, the third multi-core fiber, and the fourth multi-core fiber, wherein two multi-core fibers other than the one multi-core fiber receive the light reflected by a mirror, and wherein arrangements of cores of the two multi-core fibers in the cross section are the same as each other.

6. An optical switch comprising:

an optical fiber bundle comprising:

four or more multi-core fibers; and a ferrule bundling and holding the four or more multi-core fibers, wherein in a cross section where, among the four or more multi-core fibers, a first multi-core fiber, a second multi-core fiber, a third multi-core fiber, and a fourth multi-core fiber are cut along a plane perpendicular to a direction in which each multi-core fiber extends, lines connecting center positions of each of the multi-core fibers are arranged to form a square shape, wherein, in the cross section, the first multi-core fiber and the second multi-core fiber are aligned in this order along a first direction, wherein the first multi-core fiber and the fourth multi-core fiber are aligned in this order along a second direction perpendicular to the first direction, wherein the fourth multi-core fiber and the third multi-core fiber are aligned in this order along the first direction, wherein, in the cross section, arrangement of cores of the first multi-core fiber and arrangement of cores of the second multi-core fiber are the same as each other, wherein arrangement of cores of the third multi-core fiber and arrangement of cores of the fourth multi-core fiber are the same as each other, and wherein the arrangement of the cores of the first multi-core fiber when the first multi-core fiber is rotated 180° in a circumferential direction of the first multi-core fiber is the same as the arrangement of the cores of the fourth multi-core fiber;

a mirror reflecting light emitted from the optical fiber bundle; and a prism inserted into and ejected from an optical path of the light emitted from the optical fiber bundle.

7. An optical fiber bundle comprising:

four or more multi-core fibers; and a ferrule bundling and holding the four or more multi-core fibers, wherein in a cross section where, among the four or more multi-core fibers, a first multi-core fiber, a second multi-core fiber, a third multi-core fiber, and a fourth multi-core fiber are cut along a plane perpendicular to a direction in which each multi-core fiber extends, lines connecting center positions of each of the multi-core fibers are arranged to form a square shape, wherein, in the cross section, the first multi-core fiber and the second multi-core fiber are aligned in this order along a first direction, wherein the first multi-core fiber and the fourth multi-core fiber are aligned in this order along a second direction perpendicular to the first direction, wherein the fourth multi-core fiber and the third multi-core fiber are aligned in this order along the first direction, wherein, in the cross section, arrangement of cores of the first multi-core fiber and arrangement of cores of the second multi-core fiber are the same as each other, wherein arrangement of cores of the third multi-core fiber and arrangement of cores of the fourth multi-core fiber are the same as each other, wherein the arrangement of the cores of the first multi-core fiber when the first multi-core fiber is rotated 180° in a circumferential direction of the first multi-core fiber is the same as the arrangement of the cores of the fourth multi-core fiber, and wherein each of the four or more multi-core fibers is circular in shape in the cross section.

8. The optical fiber bundle according to claim 7, wherein the ferrule has one optical fiber holding hole into which the four or more multi-core fibers are inserted, and wherein, in the cross section, the optical fiber holding hole exhibits a rectangular shape.

\* \* \* \* \*